US006757714B1

(12) United States Patent
Hansen

(10) Patent No.: US 6,757,714 B1
(45) Date of Patent: Jun. 29, 2004

(54) REPORTING THE STATE OF AN APPARATUS TO A REMOTE COMPUTER

(75) Inventor: James R. Hansen, Franklin, MA (US)

(73) Assignee: Axeda Systems Operating Company, Inc., Mansfield, MA (US)

( * ) Notice: Subject to any disclaimer, the term of this patent is extended or adjusted under 35 U.S.C. 154(b) by 673 days.

(21) Appl. No.: 09/627,201

(22) Filed: Jul. 28, 2000

(51) Int. Cl.[7] .............................................. G06F 15/16
(52) U.S. Cl. ......................................... 709/206; 700/9
(58) Field of Search ................................ 709/206, 224, 709/218, 104, 203, 217, 228, 204; 700/9; 714/4; 702/130; 379/67, 28, 114, 115; 368/251; 370/216; 717/146

(56) References Cited

U.S. PATENT DOCUMENTS

| | | | |
|---|---|---|---|
| 5,077,582 A | | 12/1991 | Kravette et al. |
| 5,555,191 A | * | 9/1996 | Hripcsak ................... 709/224 |
| 5,715,393 A | | 2/1998 | Naugle |
| 5,809,237 A | | 9/1998 | Watts et al. |
| 6,003,061 A | * | 12/1999 | Jones et al. ................ 709/104 |
| 6,061,603 A | | 5/2000 | Papadopoulos et al. |
| 6,317,783 B1 | * | 11/2001 | Freishtat et al. ............ 709/218 |
| 6,449,633 B1 | * | 9/2002 | Van et al. ................... 709/203 |
| 6,477,117 B1 | * | 11/2002 | Narayanaswami et al. .. 368/251 |
| 6,510,350 B1 | * | 1/2003 | Steen, III et al. ............... 700/9 |
| 6,523,130 B1 | * | 2/2003 | Hickman et al. ............... 714/4 |
| 6,529,848 B2 | * | 3/2003 | Sone .......................... 702/130 |
| 6,549,612 B2 | * | 4/2003 | Gifford et al. ................ 379/67 |

2002/0006790 A1    1/2002   Blumeenstock et al.

FOREIGN PATENT DOCUMENTS

| | | |
|---|---|---|
| JP | 200122952 | 4/2000 |
| WO | WO 99 57649 | 11/1999 |
| WO | WO 99 57838 | 11/1999 |
| WO | WO 00/23894 | 4/2000 |

OTHER PUBLICATIONS

CORBA and XML Integration in Enterprise System—Ennis (2000)     ;     www.iona.com/info/techcenter/ecoop2000apr17.pdf.*

Implementing incremental code migration with XML Emmerich, W. et al ,IEEE Jun. 4–11, 2000.*

XML–based data systems for Earth science applications Suresh, R et al; IEEE 2000 International , vol.:3, Jul. 24–28, 2000.* http://www.upnp.org/download/UPnPDA10 20000613.htm (pp. 1–52).

* cited by examiner

*Primary Examiner*—Jack B. Harvey
*Assistant Examiner*—Thong Vu
(74) *Attorney, Agent, or Firm*—Fish & Richardson P.C.

(57) ABSTRACT

The state of an apparatus is reported to a remote computer using an embedded device in the apparatus. The embedded device detects the state, generates an electronic mail message that reports the state using a self-describing computer language, and sends the electronic mail message to the remote computer. The remote computer receives the electronic mail message and extracts the state of the embedded device from the message.

59 Claims, 2 Drawing Sheets

REPORTING THE STATE OF AN APPARATUS TO A REMOTE COMPUTER

BACKGROUND

This invention relates to using a device embedded in an apparatus (an "embedded device") to report the state of the apparatus to a remote computer.

An apparatus may contain an embedded device, such as a controller, to monitor and control its operation. Any type of apparatus may have an embedded device, including, but not limited to, home appliances, such as washing machines, dishwashers, and televisions, and manufacturing equipment, such as robotics, conveyors and motors.

Embedded devices are often connected to an internal network, such as a local area network (LAN), with an interface to the Internet. Other devices on the internal network may communicate with the embedded devices over the internal network.

SUMMARY

In general, in one aspect, the invention is directed to using a device embedded in an apparatus to report the state of the apparatus to a remote computer. This aspect of the invention features detecting the state of the apparatus, generating an e-mail message that reports the state of the apparatus using a self-describing computer language, and sending the e-mail message to the remote computer. An example of a self-describing computer language is eXtensible Markup Language (XML).

Using e-mail, the remote computer can obtain the state of the apparatus even if the remote computer cannot directly address the embedded device. Thus, computers that cannot communicate directly with the embedded device, such as computers that are not on the same internal network as the embedded device, can still obtain the status of the apparatus. Moreover, because the state is reported using a self-describing computer language, the remote computer can interpret the state without the aid of a person. As a result, processes, such as maintenance and the like, can be scheduled automatically for the apparatus and/or embedded device by the remote computer.

This aspect of the invention may include one or more of the following features. The state is indicative of an error condition in the apparatus. The error condition is a variable that deviates from an acceptable value or a predetermined range of acceptable values. The function of detecting the state includes receiving the state from the apparatus by, e.g., retrieving the state periodically from the apparatus. The function of detecting the state includes obtaining an identifier for the apparatus, the identifier relating to the state of the apparatus, and using the embedded device to read the state from the apparatus using the identifier.

This aspect of the invention may also include determining if the state of the apparatus has changed. The e-mail message is generated if the state of the apparatus has changed and is not generated otherwise. The function of determining if the state of the apparatus has changed includes comparing the state received from the apparatus to a previous state of the apparatus.

The e-mail message is generated using a predefined template by obtaining one or more variables relating to the apparatus and inserting the one or more variables into the template. The state of the apparatus may be included as part of a body of the e-mail message or as part of an attachment to the e-mail message.

In general, in another aspect, the invention is directed to obtaining a state of an apparatus from a device, such as a controller, embedded in the apparatus. This aspect of the invention features receiving an e-mail message that reports the state of the apparatus using a self-describing computer language and extracting the state of the apparatus from the e-mail message.

This aspect of the invention may include one or more of the following features. The self-describing computer language is XML. The state of the apparatus is indicative of an error condition in the apparatus. The error condition is a variable that deviates from an acceptable value or a predetermined range of acceptable values. The state of the apparatus is passed to a customer relationship management system.

In general, in another aspect, the invention features a system that includes first and second devices. The first device includes circuitry that generates an electronic mail message reporting a state of an apparatus using a self-describing computer language. The second device is in communication with the first device. The second device includes circuitry that receives the electronic mail message from the first device.

This aspect of the invention may include one or more of the following features. The second device receives the e-mail message from the first device and extracts the state of the apparatus from the e-mail message. The first device is embedded in the apparatus and the second device is a remote computer.

Other features and advantages of the invention will become apparent from the following description, including the claims and drawings.

DESCRIPTION

Figure 1:
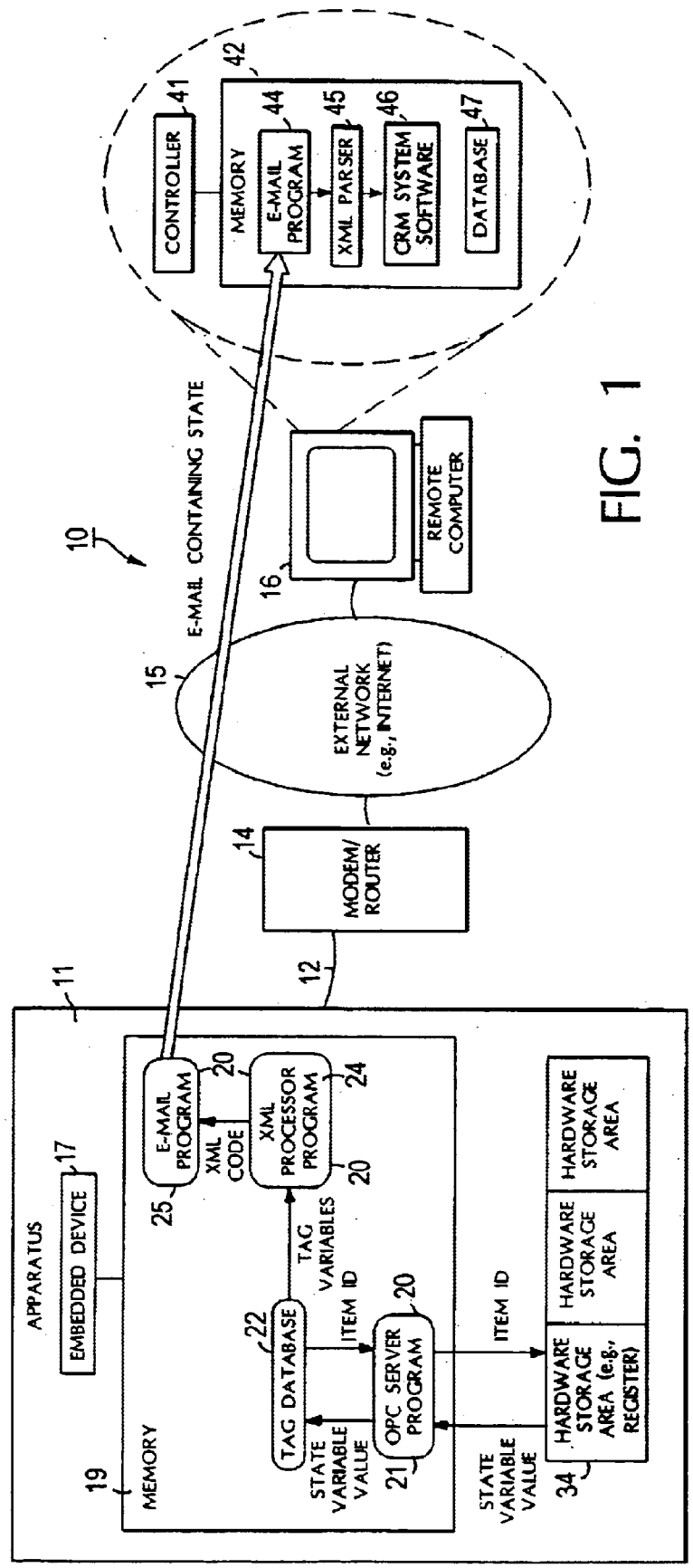
FIG. 1 is a block diagram of a network containing a remote computer and an apparatus having an embedded device.

FIG. 1 shows a network 10. Network 10 includes an apparatus 11 containing an embedded device 17, such as a controller (e.g., a microprocessor). Apparatus 11 is connected to an internal network 12, such as a LAN. A router or modem 14 interfaces internal network 12 to an external network 15, such as the Internet, that runs TCP/IP (Transmission Control Protocol/Internet Protocol) or some other suitable protocol. Connections may be, e.g., via Ethernet or a wireless link. External network 15 contains remote computer 16, which may be a server, a personal computer (PC), or any other type of processing device. Other devices (not shown) may be included on internal network 12 and external network 15.

Processing in the Embedded Device

Apparatus 11 may be any type of device or may be included in any system having functions that are monitored and controlled by embedded device 17. Among other things, embedded device 17 executes software stored in memory 19 to generate and send, to remote computer 16, an e-mail message reporting the state of apparatus 11.

Software 20 includes an OPC (OLE for Process Control) server program 21, an XML (extensible Markup Language) processor program 24, and an e-mail program 25. E-mail program 25 is an SMTP-compliant (Simple Mail Transfer Protocol) program for sending e-mail from embedded device 17 to Internet addresses and for receiving e-mail from the Internet. E-mail program 25 operates as a mail transfer agent (MTA) for e-mail messages arriving at embedded device 17 and a mail delivery agent (MDA) for e-mail messages originating from embedded device 17. Other mail transfer protocols and programs may be also used by embedded device 17 in addition to, or instead of, those noted above.

XML processor program 24 is a program for generating XML code that reports the state of apparatus 11. XML is a self-describing computer language that defines variables and values relating to those variables. XML is self-describing in the sense that fields in the XML code identify variables and their values in the XML code. The template for XML used to generate an e-mail is as follows:

<name>temperature</name><value><##temperature##></value>, where the "name" field identifies the name of a variable and the "value" field identifies the value of the variable that follows the "name" field. So, for the example given above, the variable is "temperature" and a value (e.g., 33.8) may be inserted for that variable as follows:

<name>temperature</name><value>33.8</value>.

XML processor program 24 generates XML code having the above syntax from a tag database 22 stored in memory 19.

Figure 2:
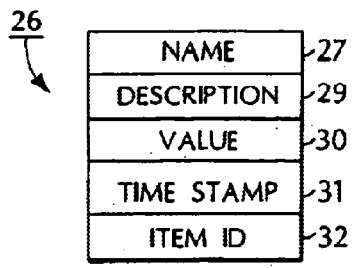
FIG. 2 shows the format of a tag used to store state variables for the apparatus.

Tag database 22 contains tags for use by XML processor program 24 in generating XML code. FIG. 2 shows an example of a format for a tag 26, although other formats may be used. Tag 26 contains a name field 27, a description field 29, a value field 30, a time stamp field 31, and an item identifier (ID) field 32. These fields are used to obtain, identify and store information relating to apparatus 11.

Name field 27 holds the name of a state variable for apparatus 11, such as "temperature", and description field 29 provides further identification information, such as "temperature of fluid in a tank". Value field 30 holds the value of the state variable and time stamp field 31 holds the time that the value in value field 30 was obtained. Value field 30 may include a variant, which is a construct that holds the value as an integer, a real number, a boolean, a character string, or some other type. Item ID field 32 holds an identifier that corresponds to hardware that is being monitored within apparatus 11. The identifier corresponds to a register location or to some other storage area of apparatus 11 that contains the value for field 30. For example, if embedded device 17 is in a robotics system, item ID field 32 might correspond to a register in the robotics system that contains a velocity or position of a robotic arm.

OPC server program 21 reads item IDs from field 32 and uses those item IDs to read variable values from corresponding hardware storage areas 34. OPC server program 21 implements an industrial automation protocol, such as MODBUS TCP, to communicate with the apparatus hardware. The system is not limited to use with the MODBUS protocol or with OPC server program 21; any drivers or computer programs may be used to read the state variable values from the hardware. Once a state variable value has been read, OPC server program 21 inserts the variable value into field 30 of the appropriate tag.

Figure 3:
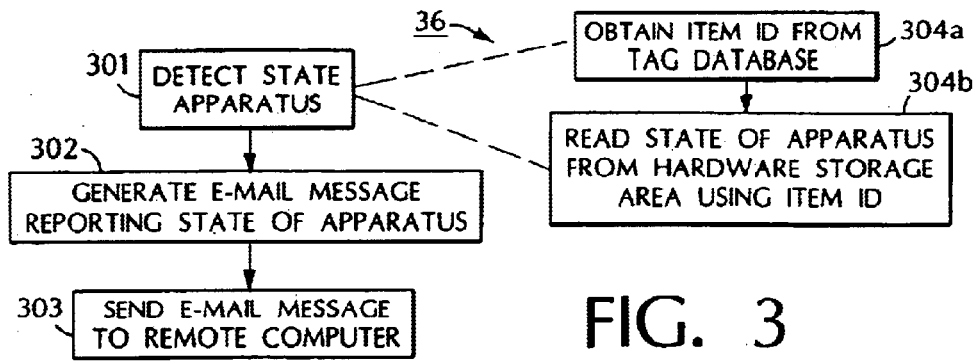
FIG. 3 is flowchart of a process performed by the embedded device to report the state of the apparatus to the remote computer through e-mail.

FIG. 3 shows a process 36 for reporting the state of apparatus 11 to remote computer 16 using e-mail. In this embodiment, process 36 is implemented by OPC server program 21, XML processor program 24, e-mail program 25, and system software (not shown) executing in embedded device 17. The system software may include an operating system or other programs that control the background operation of embedded device 17.

Process 36 detects (301) the state of apparatus 11. The state may be indicative of an error condition (described below) within apparatus 11 or it may simply be state variables of apparatus 11 that are obtained at a particular time. To detect the state of apparatus 11, OPC server program 21 polls the hardware in apparatus 11 periodically. To perform this polling, OPC server program 21 obtains (301a) an item ID from tag database 22 and reads (301b) the value of a state variable that corresponds to the item ID from the appropriate hardware storage location. Process 36 may report the value to the remote computer as is or, alternatively, process 36 may use the value to identify and report an error condition in the hardware. A process for reporting error conditions is described below.

Process 36 generates (302) an e-mail message reporting the value of state variable(s) for apparatus 11. Specifically, XML processor program 24 retrieves both the name of each state variable and the value of the state variable from the appropriate tag(s) in tag database 22. Other variables may also be retrieved from tag database 22 including the time stamp, description, and whatever other variables are stored in tag database 22. Which information is retrieved is pre-set in XML processor program 24. The retrieved variables are used by XML processor program 24 to generate XML code for an e-mail to remote computer 16.

XML processor program 24 may generate the XML code "on the fly", meaning without the use of a template. In this case, a blank XML file is populated with the retrieved variables in XML format by XML processor program 24.

Alternatively, XML processor program 24 may generate the XML code using a pre-defined and formatted template. The template may be obtained by XML processor program 24, e.g., from memory 19 or a remote storage location (not shown). For example, the template may contain formatting similar to that shown above, namely:

<name>temperature</name><value><##temperature##></value>.

To generate the XML code from the template, XML processor program 24 scans through the template and inserts state variable value(s) retrieved from tag database 22, where appropriate. XML processor program 24 may generate the XML code periodically, depending upon how often e-mails are to be sent to the remote computer. Alternatively, tag manager software (not shown) may be included to provide newly-received tag variables to XML processor program 24. In this case, XML processor program 24 generates the XML code when it receives the new tag variables.

The resulting XML code may be part of the body of an e-mail or it may part of an attachment to an e-mail. The e-mail also contains a unique identifier, such as a code, that identifies embedded device 17 to remote computer 16. E-mail program 25 obtains the XML code from XML processor program 24 and sends it to remote computer 16 as part of the e-mail message. E-mail program 25 obtains the code periodically, depending upon the frequency at which e-mails are to be sent to the remote computer. The frequency is set beforehand in embedded device 17. The address of the remote computer may be registered with e-mail program 25 beforehand. Typically, the address/remote computer will be that of an entity that requires information about apparatus 11. For example, the entity may be a manufacturer of the apparatus, a plant monitoring system, or the like. The e-mail program sends the message to router/modem 14, which transfers it via external network 15 to remote computer 16. There, the e-mail message is processed in the manner described below.

The foregoing describes the case where embedded device 17 simply reports the state of apparatus 11 to remote computer 16 periodically. Alternatively, embedded device 17 may report the state to remote computer 16 only when an error condition or "alarm" is detected.

Figure 4:
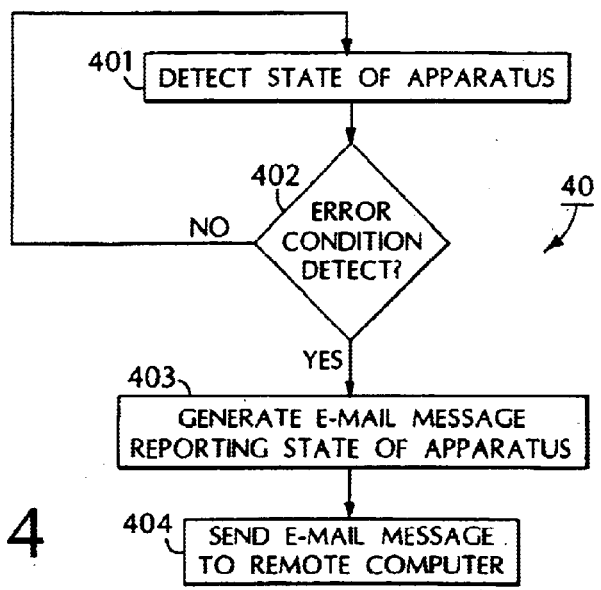
FIG. 4 is a flowchart of an alternative process performed by the embedded device to report the state of the apparatus to the remote computer through e-mail.

FIG. 4 shows a process 40 by which embedded device 17 detects error conditions in apparatus 11 and sends an e-mail message to remote computer 16 when an error condition is detected. Process 40 detects (401) the state of apparatus 11, where, as above, "state" refers to tag variable values for apparatus 11. Detection (401) is performed in the same manner as process 36; therefore, a description is omitted here. Once process 36 has obtained the state of apparatus 11, process 36 determines (402) if that state represents an error condition.

To detect an error condition, process 40 may compare an obtained state variable value to a predetermined acceptable value or a range of predetermined acceptable values. If the statevariable value is outside the range of, or deviates considerably from, the acceptable value(s), then process 40 knows that an error condition is present. Alternatively, process 40 may store each state variable value in memory 19 as it is obtained, and compare each newly-received state variable value to one or more stored state variable values. If the new state variable value deviates by more than a predetermined amount from the stored value(s), process 40 knows that an error condition is present/has occurred.

An error condition may be based on a single state variable value or it may be based on some combination of two or more state variable values. For example, if embedded device 17 is in manufacturing equipment that monitors both a level of fluid in a tank and a temperature of that fluid, an error condition may only be present if both the fluid level and the temperature exceed preset values. In this example, therefore, if only one state variable exceeds its corresponding preset value, then no error condition is present/has occurred.

If process 40 detects (402) an error condition, process 40 generates (403) an e-mail message and sends (404) the e-mail message to remote computer 16. The functions of generating and sending an e-mail message are performed as described above with respect to process 36; therefore, detailed descriptions are omitted here. When generating the e-mail message, e-mail program 25 may place the state variable(s) that caused the error condition in the "subject" line of the e-mail. If process 40 does not detect (402) an error condition, an e-mail message is not sent, whereafter process 40 returns to 401.

XML processor program 24 may maintain a log of error conditions in memory 19. This error condition "history" may be provided along with each new e-mail message. The history may relate to a particular state variable or to more than one state variable. For example, if the error condition pertains to temperature, XML processor program 24 may include the error condition history for temperature in the e-mail. If the error condition pertains to both temperature and tank level, XML processor program 24 may include the error condition history for both temperature and tank level in the e-mail. If a template is used to generate the e-mail message, portion(s) of that template may be reserved for error condition history.

Processes 36 and 40 can be combined to generate an e-mail periodically that reports the state of apparatus 11 to remote computer 16 even if no error conditions have been detected in apparatus 11, and that also flags any error conditions if any have been detected. XML processor program 24 adds an indicator or the like next to state variable values that correspond to error conditions.

Processes 36 and 40 may be executed by embedded device 17 to monitor and report on any type of state variables in any type of apparatus. For example, processes 36 and 40 may detect state variable values relating to conveyor belt speed, current and/or voltage in electronic devices, tank fluid levels, input/output sensors, and the like. Processes 36 and 40 may detect state variable values through a programmable logic controller (PLC) that is connected to one or more other devices. A PLC includes plug-in cards for each device that obtain and store device state variable values. OPC server program 21 communicates with these plug-in cards to obtain the device state variable values for generating e-mails as described above.

E-mails generated by processes 36 and 40 report the state of apparatus 11 using a self-describing computer language, such as XML; however, other types of self-describing computer languages may be used. In addition, other text and/or images may be included in the e-mails, if desired and appropriate under the circumstances. Described below is a process that is performed by remote computer 16 to interpret e-mails received from embedded device 17.

Processing in the Remote Computer

Remote computer 16 contains a controller 41 for executing software stored in memory 42. Among this software is e-mail program 44, XML parser 45, and customer relationship management (CRM) system software 46.

As in embedded device 17, e-mail program 44 is an SMTP-compliant program for receiving e-mail from embedded device 17 and other such devices. E-mail program 44 operates as a mail transfer agent (MTA) for e-mail messages arriving at remote computer 16 and a mail delivery agent (MDA) for e-mail messages originating from remote computer 16. E-mail program 44 uses the same protocol as e-mail program 25 in embedded device 17.

XML parser 45 parses XML code in a received e-mail to extract variable values, including an identifier for apparatus 11. XML parser 45 recognizes field names, such as "name" and "value" from above and extracts corresponding state variable values from those fields. That is, XML parser 45 knows the syntax of XML. Knowing this, XML parser 45 is able to extract variable names from the "name" fields, corresponding variable values from the "value" fields, and any other information in the XML code.

XML parser 45 passes the state variable values, along with appropriate identifiers, to customer relationship management system software 46 or whatever other software requires/uses those state variable values.

Figure 5:
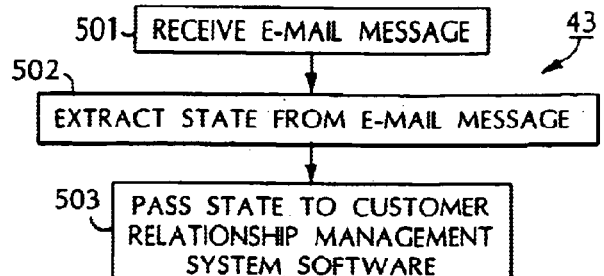
FIG. 5 is a flowchart of a process performed by the remote computer to interpret e-mail messages received from the embedded device.

FIG. 5 shows how an e-mail from embedded device 17 is processed (43). Once an e-mail has been received (501) from embedded device 17, XML parser 45 extracts (502) the state variable values of apparatus 11 from the e-mail. For example, XML parser 45 may extract tank levels, temperature values, etc., of apparatus 11 monitored by embedded device 17. The state variable values may be indicative of error conditions in apparatus 11, as defined above, or simply state variables for apparatus 11 obtained at a given point in time.

XML parser 45 passes (503) the state variable values, i.e., the state of apparatus 11, to customer relationship management system software 46. Customer relationship management system software 46 uses these state variable values, e.g., to schedule maintenance for apparatus 11 if necessary, to provide software upgrades to apparatus 11, or for any other purpose. Because the XML code in the e-mail is readable by XML parser 45, reporting and scheduling by customer relationship management system software 46 can be done automatically. It is noted that e-mail program 44 may still forward an e-mail to a customer representative, technician, or the like, particularly if an e-mail contains human-readable text.

The software on remote computer 16 is not limited to that shown in FIG. 1. For example, XML parser 45 may be replaced by a parser that is capable of parsing/reading other types of computer code, depending upon the code that is used in the received e-mail. Likewise, the parsed variables can be passed to software other than customer relationship management system software 46. For example, the variables can be stored in a database 47 for later use.

Architecture

Processes 36, 40 and 43 are not limited to use with the hardware/software configuration of FIG. 1; they may find applicability in any computing or processing environment. Processes 36, 40 and 43 may be implemented in hardware (e.g., an ASIC {Application-Specific Integrated Circuit} and/or an FPGA {Field Programmable Gate Array}), software, or a combination of hardware and software.

Processes 36, 40 and 43 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 36, 40 and 43.

Processes 36, 40 and 43 may also be implemented as a computer-readable storage medium, configured with a computer program, where, upon execution, instructions in the computer program cause the computer to operate in accordance with processes 36, 40 and 43.

Other embodiments not described herein are also within the scope of the following claims.

What is claimed is:

1. A method performed by a device associated with an apparatus to report a state of the apparatus to a remote computer that cannot directly address the device, the method comprising:
   detecting the state of the apparatus, wherein detecting is performed by monitoring variables associated with the apparatus, the monitoring occurring independently of communications from the remote computer;
   generating a message that reports the state of the apparatus using a self-describing computer language, wherein generating is performed periodically or in response to a deviation in the state; and
   sending the message to the remote computer;
   wherein the deviation is indicative of an error condition in the apparatus, and wherein the error condition comprises one or more variables that deviate from an acceptable value or a predetermined range of acceptable values.

2. The method of claim 1, wherein detecting the state comprises receiving the variables from the apparatus.

3. The method of claim 1, wherein the message comprises an electronic mail message.

4. The method of claim 1, wherein detecting the state comprises:
   obtaining an identifier for the apparatus; and
   reading the variables from the apparatus using the identifier.

5. The method of claim 1, further comprising determining the deviation in the state.

6. The method of claim 5, wherein determining comprises comparing the state received from the apparatus to a previous state of the apparatus.

7. The method of claim 1, wherein the self-describing computer language comprises eXtensible Markup Language (XML).

8. The method of claim 1, wherein the message is generated using a predefined template, the message being generated by:
   obtaining one or more variables relating to the apparatus; and
   inserting the one or more variables into the template.

9. The method of claim 1, wherein the state of the apparatus is included as part of a body of the message.

10. The method of claim 1, wherein the state of the apparatus is included as part of an attachment to the message.

11. The method of claim 1, wherein the device is embedded in the apparatus.

12. The method of claim 1, wherein the message includes past states of the apparatus.

13. The method of claim 1, wherein the message includes a unique identifier that corresponds to the apparatus.

14. A method, performed by a computer, for obtaining a state of an apparatus from a device associated with the apparatus, the method comprising:
   receiving a message from the device that reports the state of the apparatus using a self-describing computer language, the message being independent of communications initiated by the computer, the message being received from a network that includes the device and that is not directly addressable by the computer, the message being received periodically or in response to a deviation in the state; and
   extracting the state of the apparatus from the message;
   wherein deviation is indicative of an error condition in the apparatus, and wherein the error condition comprises one or more variables that deviate from an acceptable value or a predetermined range of acceptable values.

15. The method of claim 14, wherein the self-describing computer language comprises eXtensible Markup Language (XML).

16. The method of claim 14, further comprising passing the state of the apparatus to a customer relationship management system.

17. The method of claim 14, wherein the device is embedded in the apparatus.

18. A computer program stored on a computer-readable medium for use by a device associated with an apparatus to report a state of the apparatus to a remote computer that cannot directly address the device, the computer program comprising instructions that cause the device to:

detect the state of the apparatus, wherein detecting is performed by monitoring variables associated with the apparatus, the monitoring occurring independently of communications from the remote computer;

generate a message that reports the state of the apparatus using a self-describing computer language, wherein generating is performed periodically or in response to a deviation in the state; and send the message to the remote computer;

wherein the deviation is indicative of an error condition in the apparatus, and wherein the error condition comprises one or more variables that deviate from an acceptable value or a predetermined range of acceptable values.

19. The computer program of claim 18, wherein detecting the state comprises receiving the variables from the apparatus.

20. The computer program of claim 18, wherein the message comprises an electronic mail message.

21. The computer program of claim 18, wherein detecting the state comprises:

obtaining an identifier for the apparatus; and reading the variables from the apparatus using the identifier.

22. The computer program of claim 18, further comprising instructions that cause the device to:

determine the deviation.

23. The computer program of claim 22, wherein determining comprises comparing the state received from the apparatus to a previous state of the apparatus.

24. The computer program of claim 18, wherein the self-describing computer language comprises eXtensible Markup Language (XML).

25. The computer program of claim 18, wherein the message is generated using a predefined template, the message being generated by:

obtaining one or more variables relating to the apparatus; and inserting the one or more variables into the template.

26. The computer program of claim 18, wherein the state of the apparatus is included as part of a body of the message.

27. The computer program of claim 18, wherein the state of the apparatus is included as part of an attachment to the message.

28. The computer program of claim 18, wherein the device is embedded in the apparatus.

29. The computer program of claim 18, wherein the message includes past states of the apparatus.

30. The computer program of claim 18, wherein the message includes a unique identifier that corresponds to the apparatus.

31. A computer program stored on a computer-readable medium for use by a computer to obtain a state of an apparatus from a device associated with the apparatus, the computer program comprising instructions that cause a processor in the computer to:

receive a message from the device that reports the state of the apparatus using a self-describing computer language, the message being independent of communications initiated by the computer, the message being received from a network that includes the device and that is not directly addressable by the computer, the message being received periodically or in response to a deviation in the state; and extract the state of the apparatus from the message;

wherein the deviation is indicative of an error condition in the apparatus, and wherein the error condition comprises one or more variables that deviate from an acceptable value or a predetermined range of acceptable values.

32. The computer program of claim 31, wherein the self-describing computer language comprises eXtensible Markup Language (XML).

33. The computer program of claim 31, further comprising instructions that cause the processor to pass the state of the apparatus to a customer relationship management system.

34. The computer program of claim 31, wherein the device is embedded in the apparatus.

35. A device associated with an apparatus for reporting a state of the apparatus to a remote computer that cannot directly address the device, the device comprising circuitry which:

detects the state of the apparatus, wherein detecting is performed by monitoring variables associated with the apparatus, the monitoring occurring independently of communications from the remote computer;

generates a message that reports the state of the apparatus using a self-describing computer language, wherein generating is performed periodically or in response to a deviation in the state; and sends the message to the remote computer;

wherein the deviation is indicative of an error condition in the apparatus, and wherein the error condition comprises one or more variables that deviate from an acceptable value or a predetermined range of acceptable values.

36. The device of claim 35, wherein detecting the state comprises receiving the variables from the apparatus.

37. The device of claim 35, wherein the message comprises an electronic mail message.

38. The device of claim 35, wherein detecting the state comprises:

obtaining an identifier for the apparatus; and reading the variables from the apparatus using the identifier.

39. The device of claim 35, wherein the circuitry determines the deviation.

40. The device of claim 39, wherein determining comprises comparing the state received from the apparatus to a previous state of the apparatus.

41. The device of claim 35, wherein the self-describing computer language comprises eXtensible Markup Language (XML).

42. The device of claim 35, wherein the message is generated using a predefined template, the message being generated by:

obtaining one or more variables relating to the apparatus; and inserting the one or more variables into the template.

43. The device of claim 35, wherein the state of the apparatus is included as part of a body of the message.

44. The device of claim 35, wherein the state of the apparatus is included as part of an attachment to the message.

45. The device of claim 35, wherein the circuitry comprises a memory which stores executable instructions and a processor which executes the instructions.

46. The device of claim 35, wherein the circuitry comprises one or more of an application-specific integrated circuit and a programmable gate array.

47. The device of claim 35, wherein the device is embedded in the apparatus.

48. The device of claim 35, wherein the message includes past states of the apparatus.

49. The device of claim 35, wherein the message includes a unique identifier that corresponds to the apparatus.

50. A first apparatus for obtaining a state of a second apparatus from a device associated with the second apparatus, the first apparatus comprising circuitry which:

receives a message from the device that reports the state of the second apparatus using a self-describing computer language, the message being independent of communications initiated by the first apparatus, the message being received from a network that includes the device and that is not directly addressable by the first apparatus, the message being received periodically or in response to a deviation in the state; and extracts the state of the second apparatus from the message;

wherein the deviation is indicative of an error condition in the second apparatus, and wherein the error condition comprises one or more variables that deviate from an acceptable value or a predetermined range of acceptable values.

51. The first apparatus of claim 50, wherein the self-describing computer language comprises eXtensible Markup Language (XML).

52. The first apparatus of claim 49, wherein the circuitry passes the state of the second apparatus to a customer relationship management system.

53. The first apparatus of claim 49, wherein the circuitry comprises a memory which stores executable instructions and a processor which executes the instructions.

54. The first apparatus of claim 49, wherein the circuitry comprises one or more of an application-specific integrated circuit and a programmable gate array.

55. The first apparatus of claim 50, wherein the device is embedded in the second apparatus.

56. A system comprising:

a first device comprising circuitry which generates a message reporting a state of an apparatus using a self-describing computer language, wherein reporting is performed following monitoring of variables associated with the apparatus, the reporting occurring independently of instructions received from a second device, and wherein generating is performed periodically or in response to a deviation in the state, the deviation being indicative of an error condition in the apparatus and the error condition comprising one or more variables that deviate from an acceptable value or a predetermined range of acceptable values; and the second device, which can communicate with the first device but which cannot directly address the first device, the second device comprising circuitry which receives the message from the first device and which relays content from the message to an external system.

57. The system of claim 56, wherein the circuitry in the second device extracts the state of the apparatus from the message.

58. The system of claim 56, wherein the first device is embedded in the apparatus and the second device comprises a remote computer.

59. The system of claim 56, wherein the message includes a history log providing past states of the apparatus.

\* \* \* \* \*